United States Patent
Lintz, Jr. et al.

(10) Patent No.: US 7,523,350 B2
(45) Date of Patent: Apr. 21, 2009

(54) TIMER-BASED APPARATUS AND METHOD FOR FAULT-TOLERANT BOOTING OF A STORAGE CONTROLLER

(75) Inventors: Dwight Oliver Lintz, Jr., Lyons, CO (US); Yuanru Frank Wang, Broomfield, CO (US)

(73) Assignee: Dot Hill Systems Corporation, Carlsbad, CA (US)

( * ) Notice: Subject to any disclaimer, the term of this patent is extended or adjusted under 35 U.S.C. 154(b) by 614 days.

(21) Appl. No.: 11/140,106

(22) Filed: May 27, 2005

(65) Prior Publication Data

US 2006/0236150 A1    Oct. 19, 2006

Related U.S. Application Data

(60) Provisional application No. 60/667,861, filed on Apr. 1, 2005.

(51) Int. Cl.
    *G06F 11/00*   (2006.01)
(52) U.S. Cl. ............................. 714/36; 714/55
(58) Field of Classification Search ............ 714/36, 714/51, 55
    See application file for complete search history.

(56) References Cited

U.S. PATENT DOCUMENTS

| | | | |
|---|---|---|---|
| 5,568,641 A | 10/1996 | Nelson et al. | |
| 5,812,857 A | 9/1998 | Nelson et al. | |
| 5,937,198 A | 8/1999 | Nelson et al. | |
| 5,968,141 A | 10/1999 | Tsai | |
| 6,009,524 A | 12/1999 | Olarig et al. | |
| 6,018,806 A | 1/2000 | Cortopassi et al. | |
| 6,085,318 A | 7/2000 | Vander Kamp et al. | |
| 6,185,696 B1 * | 2/2001 | Noll | 714/6 |
| 6,275,931 B1 | 8/2001 | Narayanaswamy et al. | |
| 6,279,153 B1 | 8/2001 | Bi et al. | |
| 6,308,265 B1 * | 10/2001 | Miller | 713/2 |
| 6,317,827 B1 | 11/2001 | Cooper | |
| 6,363,463 B1 | 3/2002 | Mattison | |
| 6,421,792 B1 * | 7/2002 | Cromer et al. | 714/36 |
| 6,463,559 B1 | 10/2002 | Murphy | |
| 6,473,899 B1 | 10/2002 | Nelson et al. | |
| 6,542,981 B1 | 4/2003 | Zaidi et al. | |
| 6,651,188 B2 * | 11/2003 | Harding et al. | 714/38 |
| 6,665,813 B1 | 12/2003 | Forsman et al. | |
| 6,711,690 B2 | 3/2004 | Dayan et al. | |

(Continued)

*Primary Examiner*—Marc Duncan
(74) *Attorney, Agent, or Firm*—E. Alan Davis; James W. Huffman (57) ABSTRACT

A fault tolerant storage controller having a processor, redundant copies of a stored program, and a timer that automatically runs when the processor is reset is disclosed. Selection logic selects a first copy of the program to boot on the processor. If the timer expires before the first copy successfully boots, the timer resets the processor and re-enables itself to run again. This time, selection logic selects a second copy of the stored program. In one embodiment, the program comprises separate loader and application programs, each having a redundant copy. The loader re-enables the timer when jumping to the first copy of the application code. If the timer expires before the first application copy successfully boots, the timer resets the processor and re-enables itself to run again. This time, the loader selects a second copy of the application program. In one embodiment, the redundant copies are stored in separate FLASH devices; in another, in distinct regions of the same FLASH device.

81 Claims, 6 Drawing Sheets

U.S. PATENT DOCUMENTS

| | | | | |
|---|---|---|---|---|
| 6,757,838 B1 * | 6/2004 | Chaiken et al. | | 714/5 |
| 6,792,556 B1 | 9/2004 | Dennis | | |
| 6,892,323 B2 * | 5/2005 | Lin | | 714/36 |
| 7,010,679 B2 * | 3/2006 | Yang | | 713/2 |
| 7,024,550 B2 * | 4/2006 | Collins et al. | | 713/2 |
| 7,069,431 B2 * | 6/2006 | Dayan et al. | | 713/2 |
| 7,073,053 B1 * | 7/2006 | Oz et al. | | 713/2 |
| 7,143,275 B2 * | 11/2006 | Cepulis et al. | | 713/1 |
| 7,219,257 B1 | 5/2007 | Mahmoud et al. | | |
| 7,222,257 B1 | 5/2007 | Dibb | | |
| 7,330,997 B1 | 2/2008 | Odom | | |
| 7,356,727 B1 | 4/2008 | McGhee et al. | | |
| 7,363,520 B1 | 4/2008 | Maier, Jr. et al. | | |
| 7,467,165 B2 | 12/2008 | Okada et al. | | |
| 2001/0011347 A1 | 8/2001 | Narayanaswamy et al. | | |
| 2002/0007469 A1 | 1/2002 | Taketa et al. | | |
| 2002/0099976 A1 | 7/2002 | Sanders et al. | | |
| 2002/0118243 A1 | 8/2002 | Forman | | |
| 2002/0178351 A1 | 11/2002 | Ott | | |
| 2002/0188886 A1 | 12/2002 | Liu et al. | | |
| 2003/0154471 A1 | 8/2003 | Teachman et al. | | |
| 2004/0025002 A1 | 2/2004 | Cepulis et al. | | |
| 2004/0059958 A1 | 3/2004 | Umberger et al. | | |
| 2004/0078119 A1 | 4/2004 | Luitje et al. | | |
| 2004/0088608 A1 | 5/2004 | Nguyen et al. | | |
| 2004/0098712 A1 | 5/2004 | Pisupati et al. | | |
| 2004/0133752 A1 | 7/2004 | Suzuki et al. | | |
| 2004/0153724 A1 | 8/2004 | Nicholson et al. | | |
| 2004/0162977 A1 | 8/2004 | King et al. | | |
| 2005/0188257 A1 | 8/2005 | Morita | | |
| 2005/0283648 A1 | 12/2005 | Ashmore | | |
| 2006/0015771 A1 | 1/2006 | Van Gundy et al. | | |
| 2006/0020844 A1 | 1/2006 | Gibbons et al. | | |
| 2006/0083102 A1 | 4/2006 | Ghanem et al. | | |

* cited by examiner

Fig. 1

RAID Controller

Fig. 2

Fig. 3A   WDT COUNT REG   ⟋152

| 5:0 | COUNT | This is the count for WDT. The CPLD counts up from zero in a separate internal register each clock tick, which is 62.5 ms. If the internal register value reaches the COUNT and the ENABLE bit in the WDT_CONTROL_REG is set, the WDT has expired. In response, the CPLD will:<br>1) update the WDT_STATUS_REG bits appropriately to indicate the boot failure, and<br>2) re-load COUNT with the default value,<br>3) reset the WDT_CONTROL_REG to its default values indicated below, which causes the WDT to be re-enabled to begin monitoring the next loader boot, and<br>4) generate a true value on the controller reset signal.<br>SW may set the COUNT before enabling the WDT. For example, the loader may set the COUNT and enable the WDT just prior to jumping to the application. | 0x3F |
|---|---|---|---|
| 7:6 | | Reserved | 00 |

Fig. 3B   WDT CONTROL REG   ⟋154

| 0 | ENABLE | The CPLD sets this bit on any reset to enable the WDT to begin running.<br>SW may set this bit to enable the WDT.<br>SW may clear this bit to disable the WDT. | 1 |
|---|---|---|---|
| 1 | CLEAR_CNT | SW may set this bit to clear the COUNT in the CPLD internal register that is compared with the COUNT value. After setting the COUNT in the WDT_COUNT_REG, the loader simultaneously writes a 1 to the CLEAR_CNT bit, a 1 to the ENABLE bit, and a 0 to the LDR_WDT bit to disable the WDT from monitoring a loader boot and to begin monitoring an application boot.<br>SW may check this bit after setting it to see when the The CPLD has completed the operation.<br>The CPLD clears this bit to indicate the operation is complete. | 0 |
| 2 | LDR_WDT | When set, this bit indicates the WDT is being used to monitor a loader boot attempt.<br>When clear, this bit indicates the WDT is being used to monitor an application boot attempt.<br>The CPLD sets this bit on any reset, including any WDT timer reset.<br>SW may clear this bit to indicate the WDT is being used to monitor an application boot attempt. | 1 |
| 3 | LDR_PRI_ACCESS | This bit is used to program FLASH A and FLASH B and is only present in the embodiment of Figure 2.<br>SW sets this bit (and clears LDR_PRI_FAIL) to indicate that FLASH A is being accessed.<br>SW clears this bit to indicate that FLASH B is being accessed. | 1 |
| 4 | PRI_ACCESS | This bit has effect only if DRAM_WDT is set.<br>SW sets this bit to cause the selection logic to access the upper half of the FLASH when DRAM_WDT is set.<br>SW clears this bit to cause the selection logic to access the lower half of the FLASH when DRAM_WDT is set. | 1 |
| 5 | OVERRIDE_PRI_ACCESS | SW sets this bit to negate the effect of the PRI_ACCESS bit. That is, if OVERRIDE_PRI_ACCESS is set, the selection logic passes through to the high order FLASH address bit the corresponding processor address bit rather than using the relevant WDT state to determine the value of the upper FLASH address bit. | 0 |
| 6 | USE_SEC | SW sets this bit to indicate a user has requested the secondary application be booted first.<br>This bit retains its value after a WDT timeout reset. | 0 |
| 7 | DRAM_WDT | When clear, this bit indicates that when the microprocessor accesses the FLASH it is accessing loader code. Consequently, the selection logic uses the LDR_PRI_FAIL bit to determine whether to access the upper or lower half of the FLASH.<br>When set, this bit indicates that when the microprocessor accesses the FLASH it is accessing application code. Consequently, the selection logic uses the PRI_ACCESS bit to determine whether to access the upper or lower half of the FLASH.<br>The CPLD clears this bit on any reset, including any WDT timeout reset.<br>SW may set this bit to cause the selection logic to access the appropriate application code in FLASH based on the boot failure history.<br>Thus, if:<br>(DRAM_WDT == 0) AND (LDR_WDT == 1) ==> Loader is running out of FLASH (default)<br>(DRAM_WDT == 1) AND (LDR_WDT == 1) ==> Loader is running out of RAM<br>(DRAM_WDT == 1) AND (LDR_WDT == 0) ==> Application is running out of RAM | 0 |

Fig. 3C

WDT STATUS REG ⎯156

| | | |
|---|---|---|
| 0 | LDR_PRI_FAIL | When set, this bit indicates the most recent previous attempt to boot the primary loader failed; when cleared, indicates the most recent previous attempt to boot any loader copy was not a failure of the primary loader.<br>The CPLD sets this bit if the WDT expires during a primary loader boot-up.<br>The CPLD clears this bit if the WDT expires during a secondary loader boot-up.<br>A primary loader boot-up is indicated by (LDR_PRI_FAIL == 0) AND (LDR_WDT == 1).<br>A secondary loader boot-up is indicated by (LDR_PRI_FAIL == 1) AND (LDR_SEC_FAIL == 0) AND (LDR_WDT == 1).<br>SW may clear this bit, such as after reloading the primary loader code into the FLASH. |
| 1 | LDR_SEC_FAIL | When set, this bit indicates the most recent previous attempt to boot the secondary loader failed; when cleared, indicates the most recent previous attempt to boot any loader copy was not a failure of the secondary loader.<br>The CPLD sets this bit if the WDT expires during a secondary loader boot-up.<br>The CPLD clears this bit if the WDT expires during a primary loader boot-up.<br>SW may clear this bit, such as after reloading the secondary loader code into the FLASH. |
| 2 | APP_PRI_FAIL | When set, this bit indicates the most recent previous attempt to boot the primary application failed; when cleared, indicates the most recent previous attempt to boot any application copy was not a failure of the primary application.<br>The CPLD sets this bit if the WDT expires during a primary application boot-up.<br>The CPLD clears this bit if the WDT expires during a secondary application boot-up.<br>A primary application boot-up is indicated by (APP_PRI_FAIL == 0) AND (LDR_WDT == 0).<br>A secondary application boot-up is indicated by (APP_PRI_FAIL == 1) AND (APP_SEC_FAIL == 0) AND (LDR_WDT == 0).<br>SW may clear this bit, such as after reloading the primary application code into the FLASH. |
| 3 | APP_SEC_FAIL | When set, this bit indicates the most recent previous attempt to boot the secondary application failed; when cleared, indicates the most recent previous attempt to boot any application copy was not a failure of the secondary application.<br>The CPLD sets this bit if the WDT expires during a secondary application boot-up.<br>The CPLD clears this bit if the WDT expires during a primary application boot-up.<br>SW may clear this bit, such as after reloading the secondary application code into the FLASH. |
| 4 | LDR_PRI_PRE_FAIL | When set, this bit indicates one or more previous attempt to boot the primary loader failed; when cleared, indicates zero attempts (if LDR_PRI_FAIL == 0) to boot the primary loader have failed, or one attempt (if LDR_PRI_FAIL == 1) to boot the primary loader have failed.<br>The CPLD sets this bit if the LDR_PRI_FAIL bit is set and the WDT expires during a secondary loader boot-up. |
| 5 | LDR_SEC_PRE_FAIL | When set, this bit indicates one or more previous attempt to boot the secondary loader failed; when cleared, indicates zero attempts (if LDR_SEC_FAIL == 0) to boot the secondary loader have failed, or one attempt (if LDR_SEC_FAIL == 1) to boot the secondary loader have failed.<br>The CPLD sets this bit if the LDR_SEC_FAIL bit is set and the WDT expires during a primary loader boot-up. |
| 6 | APP_PRI_PRE_FAIL | When set, this bit indicates one or more previous attempt to boot the primary application failed; when cleared, indicates zero attempts (if APP_PRI_FAIL == 0) to boot the primary application have failed, or one attempt (if APP_PRI_FAIL == 1) to boot the primary application has failed.<br>The CPLD sets this bit if the APP_PRI_FAIL bit is set and the WDT expires during a secondary application boot-up. |
| 7 | APP_SEC_PRE_FAIL | When set, this bit indicates one or more previous attempt to boot the secondary application failed; when cleared, indicates zero attempts (if APP_SEC_FAIL == 0) to boot the secondary application have failed, or one attempt (if APP_SEC_FAIL == 1) to boot the secondary application has failed.<br>The CPLD sets this bit if the APP_SEC_FAIL bit is set and the WDT expires during a primary application boot-up. |

Fig. 5

TIMER-BASED APPARATUS AND METHOD FOR FAULT-TOLERANT BOOTING OF A STORAGE CONTROLLER

CROSS REFERENCE TO RELATED APPLICATION(S)

This application claims the benefit of pending U.S. Provisional Application Ser. No. 60/667,861 filed Apr. 1, 2005, entitled METHOD AND APPARATUS FOR A RAID CONTROLLER TO COME ONLINE AFTER EXPERIENCING A CODE CORRUPTION AND SELF-HEALING, which is hereby incorporated by reference for all purposes

FIELD OF THE INVENTION

The present invention relates in general to the field of storage controllers, and particularly to fault-tolerant bootstrapping of stored programs in storage controllers.

BACKGROUND OF THE INVENTION

Redundant Array of Inexpensive Disk (RAID) systems have become the predominant form of mass storage systems in most computer systems today that are used in applications that require high performance, large amounts of storage, and/or high data availability, such as transaction processing, banking, medical applications, database servers, internet servers, mail servers, scientific computing, and a host of other applications. A RAID controller controls a group of multiple physical disk drives in such a manner as to present a single logical disk drive (or multiple logical disk drives) to a computer operating system. RAID controllers employ the techniques of data striping and data redundancy to increase performance and data availability.

One aspect of high data availability involves reliable booting of the controller. Modern RAID controllers are intelligent controllers having microprocessors that execute stored programs that are often large and complex. For example, some of the stored programs include their own operating system. The programs are typically stored on the controller in some form of non-volatile memory, such as FLASH memory. However, execution of the programs from the FLASH memory is relatively slow. Consequently, controllers also include a volatile memory, such as random access memory (RAM), from which the microprocessor executes the programs during normal operation. When the controller is reset, the microprocessor begins fetching instructions of the stored programs from the FLASH memory. An initial portion of the stored programs, referred to as a loader program, copies the stored programs from the FLASH memory to the RAM and then executes a control transfer instruction to cause the microprocessor to execute the stored programs out of the RAM. The other stored programs may be commonly referred to as application programs. In some cases, the application programs are stored in the FLASH memory in a compressed format in order to reduce the required amount of FLASH memory, and the loader program decompresses the application programs as it copies them to RAM.

Modern FLASH memory devices have a sectored architecture. That is, the storage locations of the FLASH memory device are divided into sectors, each sector typically having a size between 8 KB and 128 KB. A characteristic of sectored FLASH memory devices is that one or more sectors of the device may be bad and other sectors may be good. Even a single bad sector may result in corruption of the stored programs such that the stored programs will fail to boot. For example, if a sector storing the loader program is bad (or the entire FLASH device is bad), then the loader program will fail to boot; in particular, the loader program will not load the application programs into RAM and transfer control thereto. Similarly, if a sector storing the application programs is bad (or the entire FLASH device is bad), then the application programs will fail to boot; in particular, although the loader program may load the application programs into RAM and transfer control thereto, the application programs will fail to operate the controller properly to transfer data between the host computer and the disk drives.

Bad FLASH memory sectors or entire bad FLASH memory devices may result during the manufacture of the FLASH memory device. Additionally, bad sectors may develop in the controller manufacturing process. Still further, bad sectors may develop in the field during use of the controller by the end user. For example, the user may instruct the controller to perform an upgrade of the stored programs, which involves burning, or programming, the FLASH memory with a new version of the stored programs. The typical process for programming a FLASH memory sector is to first erase the sector and then write to the erased sector. If a power loss or glitch occurs during the programming of the FLASH memory, then the particular sector being programmed during the power loss or glitch may be erased or only partially programmed. For another example, the circuitry used in the factory during the manufacturing process to burn the FLASH memory devices typically uses higher voltages than the circuitry on the controller to burn the FLASH memory device in the field. Consequently, the controller may fail to properly program in the field marginal sectors of the FLASH device that were correctly programmed when the controller was manufactured. Any of these types of bad sectors in the FLASH memory or an entire bad FLASH memory device may result in the controller failing to boot.

One solution to the problem of controllers failing to boot due to bad FLASH memory sectors or devices is to employ redundant controllers, such that if one controller fails to boot, the other controller performs the tasks of the failed controller. However, in some operating environments that do not require the high level of data availability that redundant controllers provide, the cost is too high; rather, a single controller is desirable in these environments. Furthermore, even in environments that are willing to incur the cost of multiple controllers, the controllers may be configured to operate independently in order to increase performance. Still further, even in a redundant controller configuration, it is unacceptable in certain mission-critical environments, such as video-on-demand or financial applications or medical applications, to have one of the redundant controllers failed for a prolonged period. Thus, in the above-mentioned scenarios, it is unacceptable for a controller to fail to boot due to a bad FLASH memory sector or device.

Therefore what is needed is a mechanism for reducing the likelihood of a controller boot failure due to a bad FLASH memory sector or device.

BRIEF SUMMARY OF INVENTION

The present invention provides a storage controller that has redundant copies of its stored programs. If one copy fails to boot, the controller attempts to boot from another copy. The controller includes a timer which automatically determines that the controller has failed to boot within a predetermined time. If a boot timeout occurs, the timer updates its state to indicate which copy failed to boot and resets the controller to attempt to boot another copy of the program. The controller includes selection logic that selects the appropriate copy to attempt to boot based on the boot failure history state. In one embodiment, the stored program comprises a separate loader program and application programs. If the loader successfully boots, it disables the timer and then re-enables the timer to monitor the application program boot attempt. If the boot of the first application copy times out, the timer updates its state to indicate which copy of the application failed to boot and resets the controller's processor to have the loader attempt to boot another copy of the application. In one embodiment, the copies are stored in separate physical non-volatile memory devices, such as separate FLASH memories. In one embodiment, the copies are stored in the same non-volatile memory device, but occupy distinct address ranges within the memory device. In one embodiment, the loader program copies are stored in separate memory devices and the application program copies are stored in the same memory device.

In one aspect, the present invention provides an apparatus for automatically selectively booting from redundant copies of a stored program in a storage controller to tolerate a fault in up to all but one of the copies, the controller having a processor that begins fetching instructions of the stored program each time the processor is reset. The apparatus includes a timer, coupled to the processor, which commences running when the processor is reset a first time and resets the processor a second time if the timer expires. The apparatus includes selection logic, coupled to the processor, which selects a first of the redundant copies for provision to the processor in response to the first reset and selects a second of the redundant copies other than the first of the redundant copies for provision to the processor in response to the second reset.

In another aspect, the present invention provides a storage controller for providing an improved probability of successfully booting. The controller includes first and second copies of a stored program. The controller also includes a microprocessor, coupled to selectively boot the first and second copies of the stored program. The controller includes selection logic, coupling the microprocessor to the first and second stored program copies. The selection logic initially selects the first stored program copy for the microprocessor to boot. The controller also includes a timer, coupled to the microprocessor, which resets the microprocessor if the microprocessor fails to boot the first stored program copy within a predetermined time and updates the selection logic to select the second stored program copy for the microprocessor to boot.

In another aspect, the present invention provides a method for improving the probability of a microprocessor of a storage controller successfully booting a program stored thereon. The method includes starting a timer in response to the microprocessor being reset. The method also includes resetting the microprocessor, after the starting the timer, if the timer expired before the microprocessor successfully boots a first copy of the stored program. The method also includes causing the microprocessor to attempt to boot a second copy of the stored program after resetting the microprocessor if the timer expired.

In another aspect, the present invention provides a method for improving the probability of a microprocessor of a storage controller successfully booting a program stored thereon. The method includes attempting to boot a first copy of the stored program. The method also includes determining whether the first copy of the stored program failed to boot. The method also includes attempting to boot a second copy of the stored program, in response to determining the first copy of the stored program failed to boot.

An advantage of the watch dog timer-based solution is that it provides a fault-tolerant solution for bad FLASH sectors without requiring human intervention. A further advantage is that it does not depend upon any of the stored programs to be error free; that is, it does not require even a single instruction of the bad copy of the program to execute successfully in order to successfully boot from the good copy of the program. A further advantage of the multiple FLASH part embodiment is that it provides not only fault-tolerance for bad sectors, but also provides fault-tolerance if a FLASH device is entirely bad.

BRIEF DESCRIPTION OF THE DRAWINGS

FIG. 3 is a block diagram illustrating the registers of the watch dog timer of FIGS. 1 and 2 according to the present invention.

DETAILED DESCRIPTION

Figure 1:
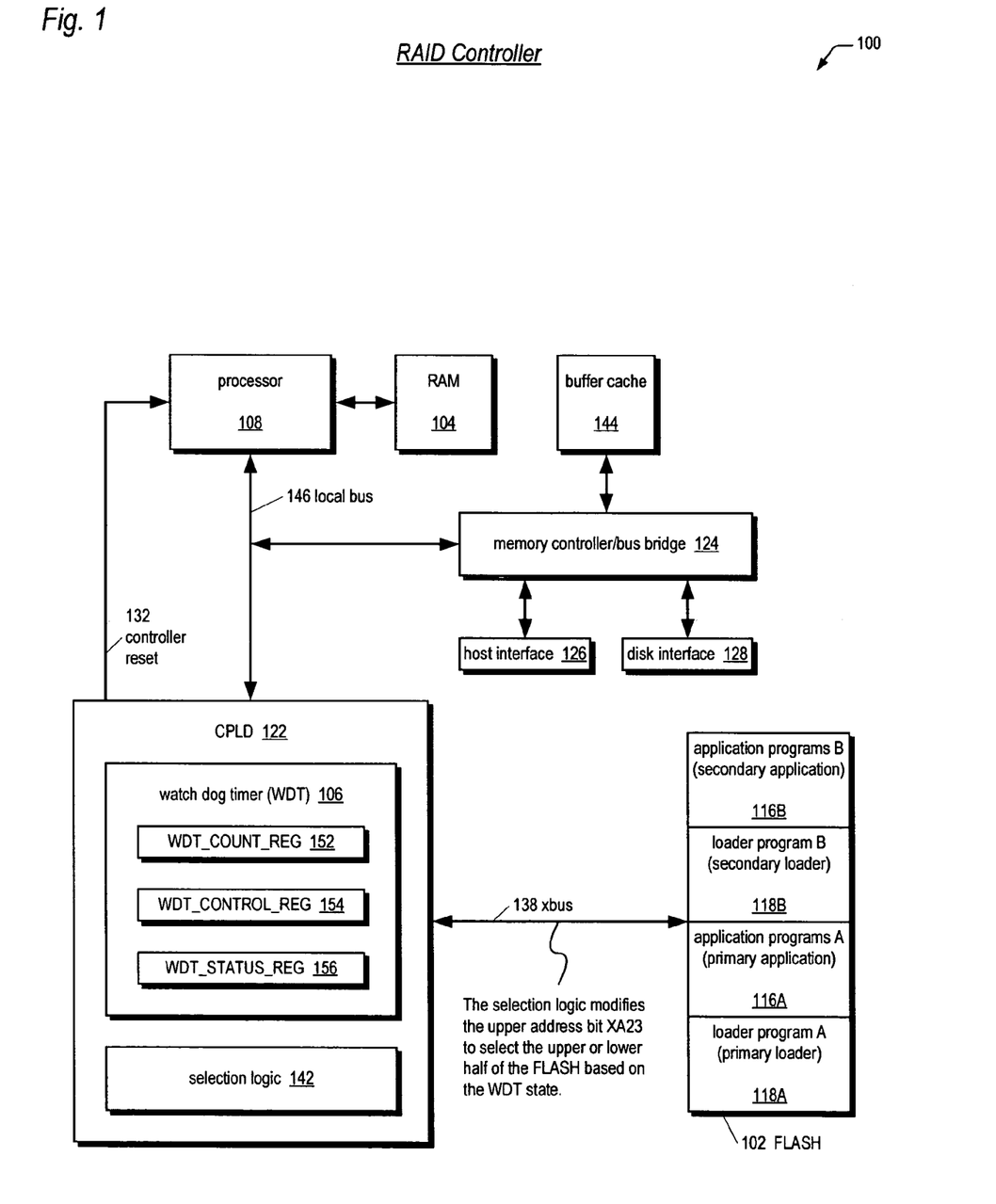
FIG. 1 is a block diagram illustrating a storage controller according to one embodiment of the present invention.

Referring now to FIG. 1, a block diagram illustrating a storage controller 100, such as a RAID controller, according to one embodiment of the present invention is shown. In one embodiment, the controller 100 may be one of a pair of active-active or active-passive redundant fault-tolerant RAID controllers for providing high data availability. In another embodiment, the controller 100 may be a single controller. Advantageously, in any system configuration, the controller 100 includes redundant copies of its stored programs and a mechanism for selectively attempting to boot different ones of the redundant copies until successfully booting as long as at least one copy is good. In one embodiment, the controller 100 includes a watch dog timer which automatically starts running each time the controller 100 attempts to boot a copy of the stored programs. If the timer expires, the timer resets the controller 100 after updating state used by selection logic to select another copy to attempt to boot.

The controller 100 includes a processor 108, or processor complex 108. Coupled to the processor 108 is random access memory (RAM) 104 from which the processor 108 executes stored programs. In particular, the controller 100 copies programs from a FLASH memory 102 to the RAM 104 for faster execution by the microprocessor 108, as described below. In one embodiment, the RAM 104 comprises a double-data-rate (DDR) RAM, and the processor 108 is coupled to the DDR RAM 104 via a DDR bus.

Also coupled to the processor 108 is a memory controller/bus bridge 124. In one embodiment, the processor 108 and memory controller/bus bridge 124 are coupled by a local bus 146, such as a PCI, PCI-X, or other PCI family local bus. Coupled to the memory controller/bus bridge 124 are a buffer cache memory 144, a host interface 126, and a disk interface 128. In one embodiment, the buffer cache 144 comprises a DDR RAM coupled to the memory controller/bus bridge 124 via a DDR bus. In one embodiment, the host interface 126 and disk interface 128 comprise PCI-X devices coupled to the memory controller/bus bridge 124 via respective PCI-X buses. The buffer cache 144 is used to buffer and cache user data as it is transferred between the host computers and the disk drives via the host interface 126 and disk interface 128, respectively.

The disk interface 128 interfaces the controller 100 to disk drives or other mass storage devices, including but not limited to, tape drives, solid-state disks (SSD), and optical storage devices, such as CDROM or DVD drives. The disk drives store user data. The disk interface 128 may include, but is not limited to, the following interfaces: Fibre Channel, Small Computer Systems Interface (SCSI), Advanced Technology Attachment (ATA), Serial Attached SCSI (SAS), Serial Advanced Technology Attachment (SATA), Ethernet, Infiniband, HIPPI, ESCON, or FICON. The controller 100 reads and writes data from or to the disk drives in response to I/O requests received from host computers.

The host interface 126 interfaces the controller 100 with host computers. In one embodiment, the controller 100 is a local bus-based controller, such as a controller that plugs into, or is integrated into, a local I/O bus of the host computer system, such as a PCI, PCI-X, CompactPCI, PCI-Express, PCI-X2, EISA, VESA, VME, RapidIO, AGP, ISA, 3GIO, HyperTransport, Futurebus, MultiBus, or any other local bus. In this type of embodiment, the host interface 126 comprises a local bus interface of the local bus type. In another embodiment, the controller 100 is a standalone controller in a separate enclosure from the host computers that issue I/O requests to the controller 100. For example, the controller 100 may be part of a storage area network (SAN). In this type of embodiment, the host interface 126 may comprise various interfaces such as Fibre Channel, Ethernet, InfiniBand, SCSI, HIPPI, Token Ring, Arcnet, FDDI, LocalTalk, ESCON, FICON, ATM, SAS, SATA, iSCSI, and the like.

The microprocessor 108 may be any processor capable of executing stored programs, including but not limited to, for example, a processor and chipset, such as an x86 architecture processor and what are commonly referred to as a North Bridge or Memory Control Hub (MCH) and a South Bridge or I/O Control Hub (ICH), which includes I/O bus interfaces, such as an interface to an ISA bus or a PCI-family bus. In one embodiment, the processor complex 108 comprises a Transmeta TM8800 processor that includes an integrated North Bridge and an ALi M1563S South Bridge. In another embodiment, the processor 108 comprises an AMD Elan SC-520 microcontroller. In another embodiment, the processor 108 comprises an Intel Celeron M processor and an MCH and ICH.

The processor 108, host interface 126, and disk interface 128, read and write data from and to the buffer cache 144 via the memory controller/bus bridge 124. The processor 108 executes application programs 116 stored in the FLASH memory 102 that control the transfer of data between the disk drives and the hosts. The processor 108 receives commands from the hosts to transfer data to or from the disk drives. In response, the processor 108 issues commands to the disk interface 128 to accomplish data transfers with the disk drives. Additionally, the processor 108 provides command completions to the hosts via the host interface 126. The processor 108 may also perform storage controller functions such as RAID control, logical block translation, buffer management, and data caching.

Also coupled to the local bus 146 is a complex programmable logic device (CPLD) 122. The CPLD 122 generates a controller reset signal 132 for resetting the controller 100. In particular, the controller reset signal 132 resets the processor 108 if the watch dog timer 106 expires to cause the processor 108 to begin fetching instructions from its reset vector location in the FLASH memory 102, as described below in detail.

In one embodiment, the controller reset signal 132 resets the other circuits of the controller 100, including the CPLD 122; however, some of the bits of the registers of the CPLD 122 retain their value through the reset, as described below, particularly with respect to FIG. 3. The CPLD 122 includes a watch dog timer (WDT) 106 and selection logic 142, which are described in more detail below. Other embodiments are contemplated in which the functions of the CPLD 122 are performed by other circuits, such as a field-programmable gate array (FPGA) or other logic devices.

The FLASH memory 102 is coupled to the CPLD 122 by an xbus 138. In one embodiment, the FLASH memory 102 is a 16 MB×8-bit FLASH memory device having 24 address bit inputs. The xbus 138 includes 24 address bits used to address the locations in the FLASH memory 102. In one embodiment, as described in detail below in Eq. (1) with respect to FIG. 3, the selection logic 142 selectively generates the upper xbus 138 address bit, bit 23 (referred to as XA23), to access the appropriate half of the FLASH memory 102 based on the watch dog timer 106 state.

The FLASH memory 102 stores one copy of a loader program, referred to as loader program A 118A, or primary loader 118A; a second copy of a loader program, referred to as loader program B 118B, or secondary loader 118B; one copy of an application program, referred to as application program A 116A, or primary application 116A; and a second copy of the application program, referred to as application program B 116B, or secondary application 116B. The primary and secondary loaders 118A/118B are referred to collectively as loaders 118 or loader programs 118. The primary and secondary applications 116A/116B are referred to collectively as applications 116 or application programs 116. The loaders 118 and applications 116 are referred to collectively as stored programs, programs, or code. In the embodiment of FIG. 1, the primary loader and application 116A/118A are stored in the upper 8 MB address range of the FLASH memory 102, and the secondary loader and application 116B/118B are stored in the lower 8 MB address range of the FLASH memory 102. In the embodiment of FIG. 1, if the OVERRIDE_PRI_ACCESS bit (of FIG. 3 below) is set such that the local bus 146 address bit 23 is passed through as xbus 138 address bit XA23, the primary loader and application 116A/118A occupy the address range 0xFF800000 to 0xFFFFFFFF in the microprocessor 108 address space, and the secondary loader and application 116B/118B occupy the address range 0xFF000000 to 0xFF7FFFFF in the microprocessor 108 address space.

It should be understood that the redundant copies of the loader program 118A/118B and the application program 116A/116B stored in the FLASH memory 102 may be different versions or revisions of the same program and are not necessarily mirror image copies. For example, it may be desirable when upgrading the stored programs in the controller 100 to burn the newer version of the program into only one copy in the FLASH memory 102 and to leave the older version of the program in the other copy in the FLASH memory 102. This may be particularly advantageous if the newer version of the program turns out to be non-operational in the user's particular configuration or to be less desirable for use by the user, because it would enable the user to configure the controller, such as via a management interface, to revert back to booting the older version of the program rather than the newer version. Thus, although the redundant copies of the programs may not be mirror image copies, they are still redundant because they perform essentially the same function, in particular such that if one copy of the program fails to boot, such as due to a bad FLASH sector or faulty programming, the other copy of the program may be successfully booted as long as the other copy does not have a fault that causes it to fail to boot.

The CPLD 122 watch dog timer 106 includes a WDT_COUNT register 152, a WDT_CONTROL register 154, and a WDT_STATUS register 156, described in detail in FIG. 3. The watch dog timer 106 provides state information, such as the values of bits in the WDT_CONTROL register 154 and WDT_STATUS register 156, to the selection logic 142. When the microprocessor 108 generates an address in the range of the FLASH memory 102, the selection logic 142 uses the watch dog timer 106 state information to select the appropriate copy of the programs 116A/116B/118A/118B stored in the FLASH memory 102 from which to provide instructions or data to the microprocessor 108, as described in detail below.

In one embodiment, the controller 100 includes a second processor for performing management functions. The controller 100 also includes loader code and application code for execution on the management processor that are also replicated within a flash memory and which incorporate the fault-tolerant boot process according to the present invention in a manner similar to the one described herein. In one embodiment, code for programming one or more field-programmable gate array (FPGA) and CPLD 122 may also be replicated within the FLASH memory 102.

Figure 2:
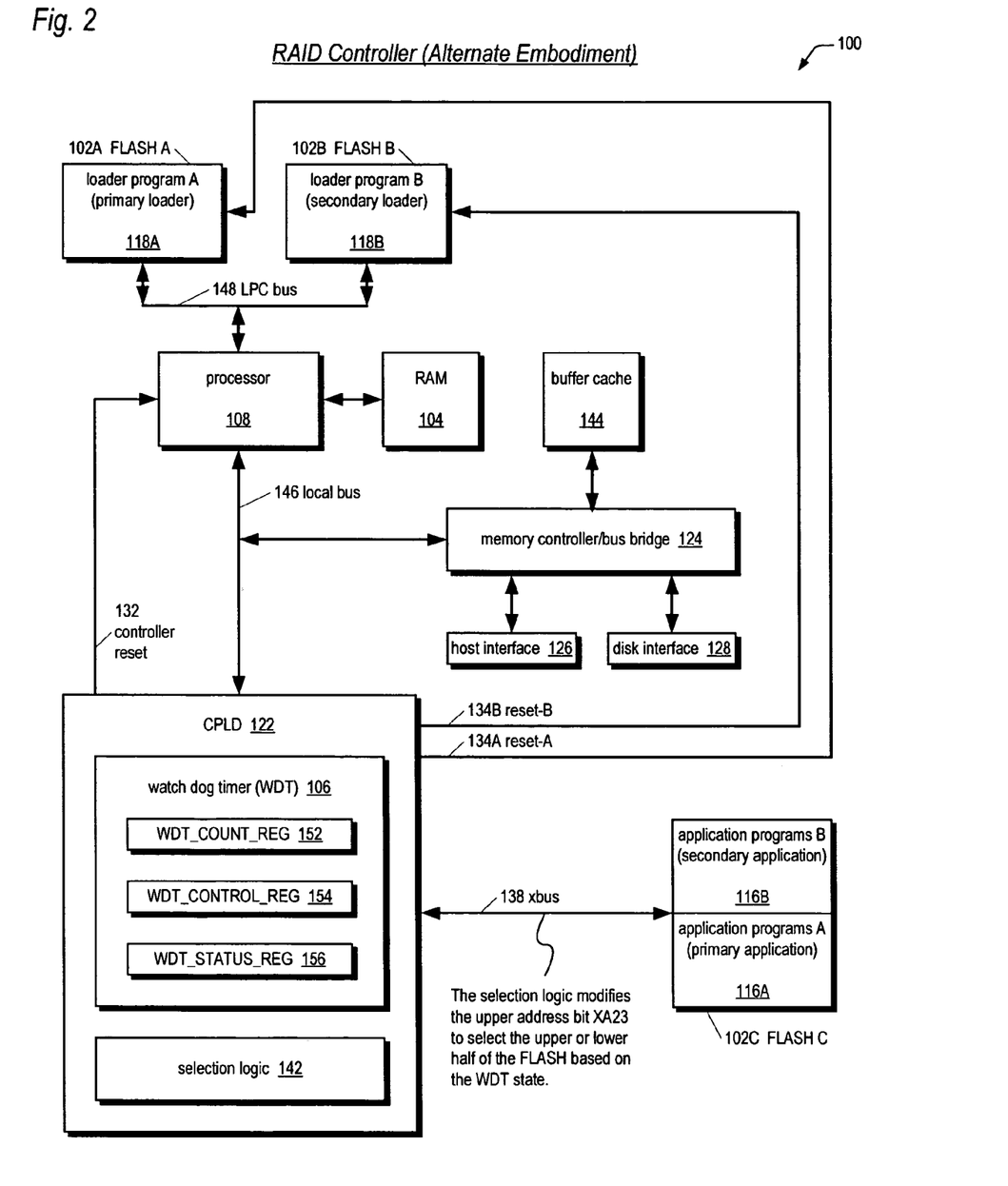
FIG. 2 is a block diagram illustrating a storage controller according to an alternate embodiment of the present invention.

Referring now to FIG. 2, a block diagram illustrating a storage controller 100 according to an alternate embodiment of the present invention is shown. The controller 100 of FIG. 2 is similar to the controller 100 of FIG. 1, except the controller 100 of FIG. 2 includes three FLASH memory devices, referred to collectively as FLASH memories 102, rather than the single FLASH memory device 102 of FIG. 1. The three FLASH memory devices 102 of the controller 100 of FIG. 2 are referred to as FLASH memory A 102A, FLASH memory B 102B, and FLASH memory C 102C.

FLASH memory C 102C is coupled to the CPLD 122 via the xbus 138 similar to the embodiment of FIG. 1; however, FLASH memory C 102C stores only the primary application 116A and the secondary application 116B. FLASH memory A 102A stores the primary loader 118A, and FLASH memory B 102B stores the secondary loader 118B. In one embodiment, each of the FLASH memory A 102A and FLASH memory B 102B devices comprises a 2 MB low pin count (LPC) FLASH memory device, that is coupled to the processor 108 via a common LPC bus 148 that is distinct from the xbus 138. In one embodiment, the LPC bus 148 comprises a 4-bit wide data bus.

FLASH memory A 102A and FLASH memory B 102B are coupled to the processor 108 via a shared bus and both receive on their chip select inputs the same chip select signal generated by the processor 108, which is different from the chip select the processor 108 generates to select FLASH memory C 102C; thus, FLASH memory A 102A and FLASH memory B 102B effectively occupy the same memory range within the processor 108 address space. The CPLD 122 generates a reset-A signal 134A and a reset-B signal 134B coupled to the reset input of FLASH memory A 102A and FLASH memory B 102B, respectively. The selection logic 142 always generates a true value on at least one of the reset-A 134A and reset-B 134B signals so that, although they effectively occupy the same memory range within the processor 108 address space, only one of the FLASH memory A 102A and FLASH memory B 102B devices responds on the shared bus to any given access by the processor 108. The selection logic 142 generates the reset-A 134A and reset-B 134B signals based on the state of the watch dog timer 106, as described in more detail below.

Referring now to FIG. 3, a block diagram illustrating the three registers 152/154/156 of the watch dog timer 106 of FIGS. 1 and 2 according to the present invention are shown. FIG. 3 includes FIG. 3A illustrating the WDT_COUNT_REG 152 of FIGS. 1 and 2, FIG. 3B illustrating the WDT_CONTROL_REG 154 of FIGS. 1 and 2, and FIG. 3C illustrating the WDT_STATUS_REG 156 of FIGS. 1 and 2. Each of the registers 152/154/156 is an 8-bit register, as shown. Each of the registers 152/154/156 is writeable and readable. FIG. 3 provides the bit number, name, and a description of the function of each bit of the three registers 152/154/156. The operation and use of the various bits of the registers will be described in detail with respect to FIG. 4 below.

The reset values of the WDT_COUNT_REG 152 and WDT_CONTROL_REG 154 are shown in the far right column of FIG. 3A and FIG. 3B, respectively. Either a power-up reset or a controller reset 132 causes the bits to have the reset values shown. The exception is the USE_SEC bit, which retains its value after a controller reset 132. Each of the bits in the WDT_STATUS_REG 156 powers up with a binary zero value. The bits of the WDT_STATUS_REG 156 retain their value through a controller reset 132 unless updated as described in FIG. 3C due to a timeout of the watch dog timer 106.

It is noted that upon reset of the CPLD 122, either in response to a power-up reset or via a controller reset 132 in response to the watch dog timer 106 expiring, the CPLD 122 hardware enables the watch dog timer 106 to commence running without any intervention from the programs executing on the processor 108. That is, the CPLD 122 enables the watch dog timer 106 to begin running to monitor the boot of the selected copy of the loader 118 before any instructions of the loader 118 are executed. Consequently, advantageously, even if the sector of the FLASH memory 102 that stores the initial portion of the loader 118 is bad such that no instructions of the loader 118 execute, the watch dog timer 106 will still expire to indicate a boot failure of the selected copy of the loader 118, and the CPLD 122 will responsively reset the processor 108 to attempt to boot the other copy of the loader 118.

The selection logic 142 of CPLD 122 of FIGS. 1 and 2 generates the upper xbus 138 address bit to the FLASH memory 102, denoted XA23, based on the state of bits in the WDT_CONTROL_REG 154 and WDT_STATUS_REG 156, as indicated by Eq. (1) here:

$$XA23 = \text{OVERRIDE\_PRI\_ACCESS} \;?\; LA23 : \\ ((\text{DRAM\_WDT} \;\&\; \text{PRI\_ACCESS}) | (!\text{DRAM\_WDT} \;\&\; !\text{LDR\_PRI\_FAIL})) \qquad \text{Eq. (1)}$$

In the equation above, LA23 denotes the corresponding local bus 146 address bit 23 generated by the processor 108, which the selection logic 142 passes through to XA23 if OVERRIDE_PRI_ACCESS is set. The loader 118 may set the OVERRIDE_PRI_ACCESS bit in order to upgrade the desired copy of the loader 118 or application program 116 in the FLASH memory 102. As shown in Eq. (1), if the OVERRIDE_PRI_ACCESS bit is clear, the selection logic 142 uses the LDR_PRI_FAIL bit to decide whether to select the upper or lower half of the FLASH memory 102 if the DRAM_WDT bit is clear, and uses the PRI_ACCESS bit if the DRAM_WDT bit is set.

With respect to the embodiment of FIG. 2, the selection logic 142 generates the reset-A 134A and reset-B 134B signals to FLASH memory A 102A and FLASH memory B 102B, respectively, based on the state of bits in the WDT_CONTROL_REG 154 and WDT_STATUS_REG 156, as indicated by equations (2) and (3) below:

$$\text{reset-B} = \text{LDR\_PRI\_ACCESS} \ \& \ !\text{LDR\_PRI\_FAIL} \quad \text{Eq. (2)}$$

$$\text{reset-A} = !\text{LDR\_PRI\_ACCESS} \ | \ \text{LDR\_PRI\_FAIL} \quad \text{Eq. (3)}$$

To program FLASH A 102A, the loader 118 sets the LDR_PRI_ACCESS bit and clears the LDR_PRI_FAIL bit. To program FLASH B 102B, the loader 118 clears the LDR_PRI_ACCESS bit.

In one embodiment, the loader 118 is configured to enter a user-interactive menu program to receive user input under certain conditions, such as when all copies of the loader 118 or application program 116 have failed to boot a predetermined number of times. In one embodiment, the predetermined number is two. When the loader 118 enters the user menu, the loader 118 clears the ENABLE bit to disable the watch dog timer 106. When the user exits the loader menu, the loader 118 re-enables the watch dog timer 106. The user may specify whether to attempt to load the primary or secondary copy of the application code first. If the user specifies the primary copy, then the loader 118 clears the USE_SEC bit; whereas, if the user specifies the secondary copy, then the loader 118 sets the USE_SEC bit. Therefore, the USE_SEC bit retains its value after a controller reset 132 to retain the user's preference.

Figure 4:
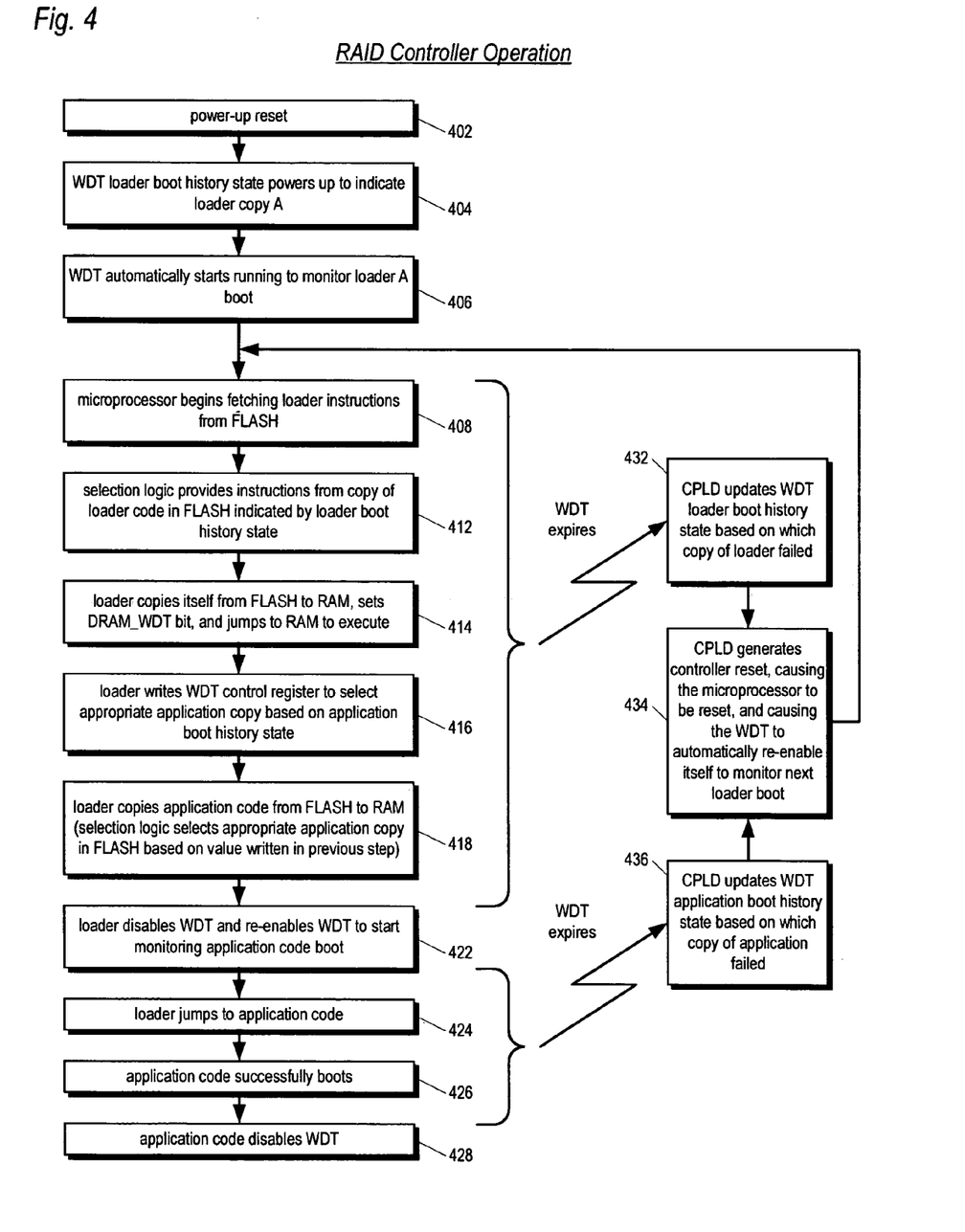
FIG. 4 is a flowchart illustrating operation of the controller of FIGS. 1 and 2 according to the present invention.

Referring now to FIG. 4, a flowchart illustrating operation of the controller 100 of FIGS. 1 and 2 according to the present invention is shown. Flow begins at block 402.

At block 402, a power-up reset of the controller 100 occurs. Consequently, each of the devices of the controller 100 are reset, and in particular, the processor 108 is reset such that it begins fetching code from its reset vector, such as 0xFFFFFFF0 in the case of an x86 architecture processor. The reset at block 402 may also comprise a reset of the entire controller 100 received from a source external to the controller 100, such as a reset received from a host computer. Flow proceeds to block 404.

At block 404, the CPLD 122 register bits obtain their power-up values indicated in FIG. 3, in response to the reset of block 402. In particular, the LDR_WDT bit is set, the DRAM_WDT bit is clear, and the LDR_PRI_FAIL bit is clear, which indicates the watch dog timer 106 will be monitoring a boot of the primary loader 118A. Additionally, this state will cause the selection logic 142 to provide instructions to the processor 108 from the primary loader 118A in response to instruction fetches by the processor 108. In the embodiment of FIG. 1, the selection logic 142 will generate a binary one on the XA23 bit to cause the FLASH 102 to provide the primary loader 118A instructions; in the embodiment of FIG. 2, the selection logic 142 will generate a true value on the reset-B signal 134B and a false value on the reset-A signal 134A to cause the FLASH B 102B to be held in reset to enable the FLASH A 102A to provide the primary loader 118A instructions. Flow proceeds to block 406.

At block 406, the watch dog timer 106 automatically starts running to monitor the primary loader 118A boot. This is because the WDT_COUNT_REG 152 and WDT_CONTROL_REG 154 obtained their reset values in response to the reset at block 404, which includes a clear LDR_PRI_FAIL bit to indicate the primary loader 118A has not failed and a set LDR_WDT bit to indicate a loader 118 is booting. Flow proceeds to block 408.

At block 408, the processor 108 begins fetching instructions from its reset vector address, which is in the FLASH memory 102 range of FIG. 1 and in the shared FLASH memory A 102A and FLASH memory B 102B range of FIG. 2. Flow proceeds to block 412.

At block 412, the selection logic 142 provides the instructions from one of the primary loader 118A and secondary loader 118B indicated by the watch dog timer 106 loader 118 boot history state, and in particular, based on the value of the LDR_PRI_FAIL bit. In the embodiment of FIG. 1, the selection logic 142 generates a binary one value on address bit XA23 to select the primary loader 118A or generates a binary zero value on address bit XA23 to select the secondary loader 118B, as described by Eq. (1) above. In the embodiment of FIG. 2, the selection logic 142 generates a true value on reset B 134B to select the primary loader 118A or generates a true value on reset A 134A to select the secondary loader 118B, as described by Eqs. (2) and (3) above. Flow proceeds to block 414.

At block 414, the loader 118 selected at block 412 copies itself from FLASH memory 102 (in the embodiment of FIG. 1, from FLASH memory 102; in the embodiment of FIG. 2, from FLASH memory A 102A or FLASH memory B 102B) to RAM 104. The selected loader 118 then sets the DRAM_WDT bit to indicate that the microprocessor 108 starts executing the loader 118 from RAM 104 and will henceforth be accessing an application program 116 in FLASH memory 102 (in the embodiment of FIG. 1, in FLASH memory 102; in the embodiment of FIG. 2, in FLASH memory C 102C) to perform the application program 116 copy to RAM 104 at block 418 below. The selected loader 118 then executes a program control transfer instruction (such as a jump, branch, or call instruction) to cause the processor 108 to begin executing the loader 118 out of the RAM 104. Flow proceeds to block 416.

At block 416, the loader 118 (executing out of the RAM 104) writes to the PRI_ACCESS bit to cause the selection logic 142 to select the appropriate one of the primary application 116A and secondary application 116B based on the application program 116 boot history. In the normal case, the loader 118 clears the PRI_ACCESS bit to select the secondary application 116B if the primary application 116A has failed to boot on the most recent attempt to boot an application program 116 (as indicated by the APP_PRI_FAIL bit being set), and otherwise the loader 118 sets the PRI_ACCESS bit to select the primary application 116A. Flow proceeds to block 418.

At block 418, the loader 118 executes instructions to read the application program 116 from FLASH memory 102 and to write the application program 116 to the RAM 104. As the processor 108 executes the instructions to read the application program 116 from FLASH memory 102, the selection logic 142 selects the appropriate application program 116 copy based on the value written to the PRI_ACCESS bit at block 416. In one embodiment, copying the application program 116 comprises decompressing a compressed form of the application program 116 stored in the FLASH memory 102 and writing the decompressed form of the application program 116 to the RAM 104. Flow proceeds to block 422.

At block 422, the loader 118 disables the watch dog timer 106 from monitoring the loader 118 boot and re-enables the watch dog timer 106 to begin monitoring the application program 116 boot. In one embodiment, the loader 118 accomplishes step 422 as an atomic operation by writing the binary value 8'b100xx011 to the WDT_CONTROL_REG 154, which simultaneously disables the watch dog timer 106 from expiring for the loader 118 (by setting the CLEAR_CNT bit), informs the CPLD 122 that the application program 116 is now running (or about to be running) rather than the loader 118 out of RAM 104 (via the LDR_WDT and DRAM_WDT bits), and enables the watch dog timer 106 (by setting the ENABLE bit) to monitor the now running (or about to be running) application program 116. The loader 118 also writes a binary one to the PRI_ACCESS bit if attempting to boot the primary application 116A (because the APP_PRI_FAIL bit is clear and the USE_SEC bit is clear), and writes a binary zero to the PRI_ACCESS bit if attempting to boot the secondary application 116B (because the APP_PRI_FAIL bit is set or the USE_SEC bit is set). Prior to writing the WDT_CONTROL_REG 154, the loader 118 may write a value in the WDT_COUNT_REG 152 different from the reset value in order to set up a timeout period for the application program 116 different from the loader 118 timeout period. Flow proceeds to block 424.

At block 424, the loader 118 executes a program control transfer instruction (such as a jump, branch, or call instruction) to cause the processor 108 to begin executing the application program 116 out of the RAM 104 that was copied there at block 414. In one embodiment, the instruction that writes to the WDT_CONTROL_REG 154 at block 422 and the instruction that jumps to the application program 116 at block 424 comprise the last two instructions of the loader 118. In another embodiment, the instruction that writes to the WDT_CONTROL_REG 154 at block 422 is the first instruction of the application program 116. Flow proceeds to block 426.

At block 426, the application program 116 executes all of its initialization code and determines that it has successfully booted. For example, the application program 116 may determine it has successfully booted when it is ready to accept I/O requests from the host computers and/or when it is ready to transfer user data with the disk drives. Flow proceeds to block 428.

At block 428, the application program 116 disables the watch dog timer 106 (by clearing the ENABLE bit) since it has successfully booted. Flow ends at block 428.

Advantageously, beginning at block 406 and up to block 422, the watch dog timer 106 runs, or ticks, while the loader 118 executes (or fails to execute if the current loader 118 copy is bad) completely independently of the execution of the loader 118 by the microprocessor 108. Consequently, the watch dog timer 106 may expire asynchronously with respect to execution of the loader 118 by the microprocessor 108. As shown in FIG. 4, if the watch dog timer 106 expires during any of blocks 408 through 418, flow proceeds to block 432.

At block 432, the CPLD 122 updates the watch dog timer 106 loader boot history state based on which copy of the loader 118 failed to boot. If the primary loader 118A failed, the CPLD 122 sets the LDR_PRI_FAIL bit; additionally, if the LDR_SEC_FAIL bit is set, the CPLD 122 sets the LDR_SEC_PRE_FAIL bit and clears the LDR_SEC_FAIL bit. Conversely, if the secondary loader 118B failed, the CPLD 122 sets the LDR_SEC_FAIL bit; additionally, if the LDR_PRI_FAIL bit is set, the CPLD 122 sets the LDR_PRI_PRE_FAIL bit and clears the LDR_PRI_FAIL bit. The CPLD 122 determines that the primary loader 118A failed if the LDR_WDT bit is set and the LDR_PRI_FAIL bit is clear; the CPLD 122 determines that the secondary loader 118B failed if the LDR_WDT bit is set, the LDR_PRI_FAIL bit is set, and the LDR_SEC_FAIL bit is clear, as described in FIG. 3. Flow proceeds to block 434.

At block 434, the CPLD 122 generates a controller reset 132. This causes the WDT_COUNT_REG 152 and WDT_CONTROL_REG 154 to obtain their reset values, and in particular to re-enable the watch dog timer 106 to monitor the immediately ensuing next attempt to boot the other copy of the loader 118, i.e., the copy that did not just fail to boot. The controller reset 132 also resets the microprocessor 108. Flow returns to block 408 to attempt to boot the other copy of the loader 118.

Advantageously, beginning at block 422 and up to block 428, the watch dog timer 106 runs, or ticks, while the application program 116 executes (or fails to execute if the current application program 116 copy is bad) completely independently of the execution of the application program 116 by the microprocessor 108. Consequently, the watch dog timer 106 may expire asynchronously with respect to execution of the application program 116 by the microprocessor 108. As shown in FIG. 4, if the watch dog timer 106 expires during any of blocks 424 through 426, flow proceeds to block 436.

At block 436, the CPLD 122 updates the watch dog timer 106 application boot history state based on which copy of the application program 116 failed to boot. If the primary application 116A failed, the CPLD 122 sets the APP_PRI_FAIL bit; additionally, if the APP_SEC_FAIL bit is set when the primary application 116A failed, the CPLD 122 sets the APP_SEC_PRE_FAIL bit and clears the APP_SEC_FAIL bit. Conversely, if the secondary application 116B failed, the CPLD 122 sets the APP_SEC_FAIL bit; additionally, if the APP_PRI_FAIL bit is set when the secondary application 116B failed, the CPLD 122 sets the APP_PRI_PRE_FAIL bit and clears the APP_PRI_FAIL bit. The CPLD 122 determines that the primary application 116A failed if the LDR_WDT bit is clear and the APP_PRI_FAIL bit is clear; the CPLD 122 determines that the secondary application 116B failed if the LDR_WDT bit is clear, the APP_PRI_FAIL bit is set, and the APP_SEC_FAIL bit is clear, as described in FIG. 3. Flow proceeds to block 434.

In one embodiment, the maximum timeout period of the watch dog timer 106 (which is 4 seconds in the embodiment of FIG. 3) may be less than the maximum time required for normal successful boot of the loader 118 or application program 116. In such an embodiment, the loader 118 or application program 116 may disable/re-enable the watch dog timer 106 at appropriate intervals during the boot process in a manner similar to the step performed at block 422; however, unlike the step performed at block 422, the loader 118 or application program 116 retains the value of the LDR_WDT bit.

Figure 5:
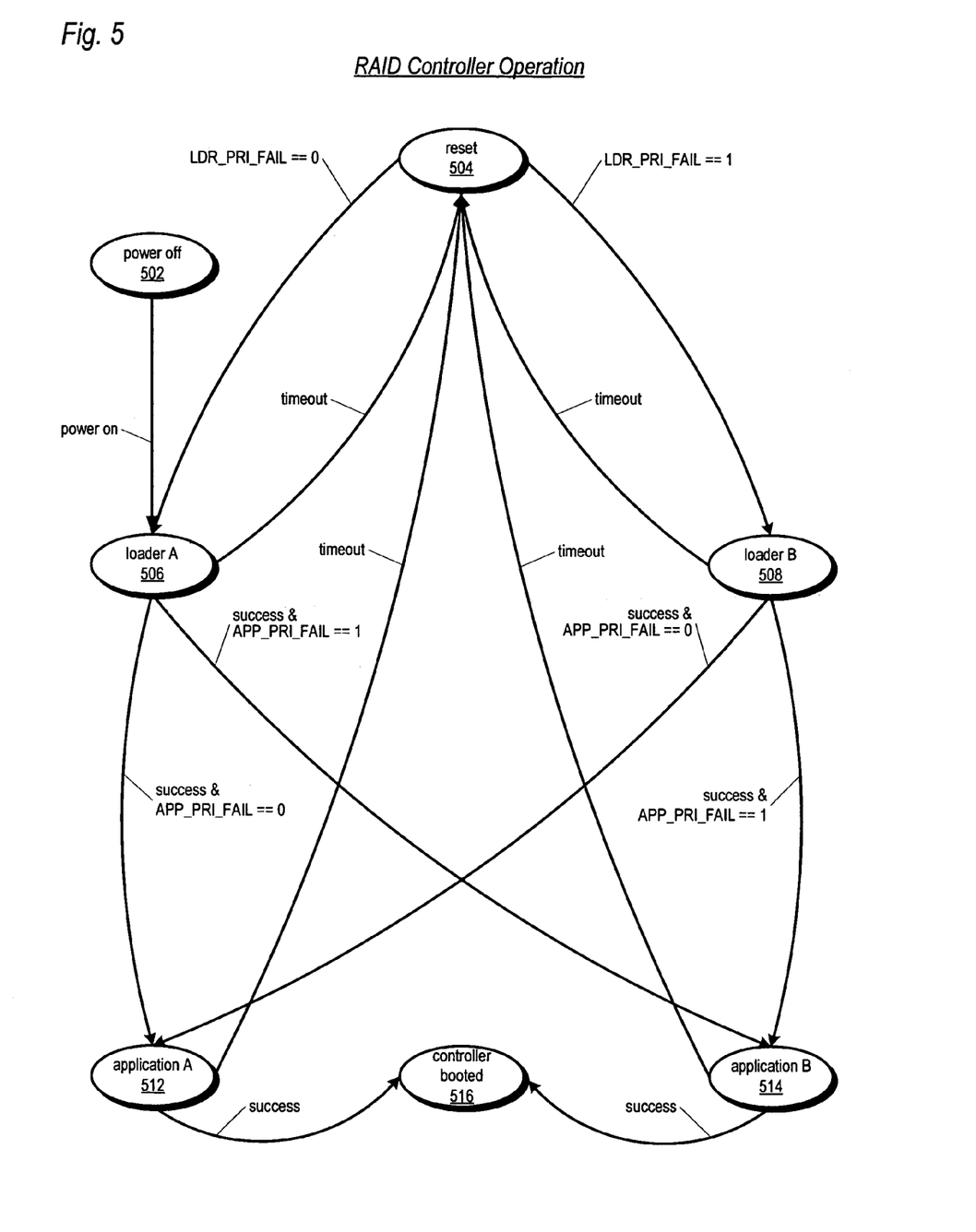
FIG. 5 is a state transition diagram illustrating operation of the controller of FIGS. 1 and 2 according to the present invention.

Referring now to FIG. 5, a state transition diagram illustrating operation of the controller 100 of FIGS. 1 and 2 according to the present invention is shown. FIG. 5 illustrates seven states: power off 502, reset 504, loader A 506, loader B 508, application A 512, application B 514, and controller booted 516.

The power off 502 state is characterized by the controller 100 being powered off. The reset 504 state is characterized by the CPLD 122 asserting the controller reset signal 132. The loader A 506 state is characterized by the LDR_WDT bit being set and the LDR_PRI_FAIL bit being clear and the microprocessor 108 attempting to boot the primary loader 118A. The loader B 508 state is characterized by the LDR_WDT bit being set, the LDR_PRI_FAIL bit being set, the LDR_SEC_FAIL bit being clear, and the microprocessor 108 attempting to boot the secondary loader 118B. The application A 512 state is characterized by the LDR_WDT bit being clear, the APP_PRI_FAIL bit being clear, and the microprocessor 108 attempting to boot the primary application 116A. The application B 514 state is characterized by the LDR_WDT bit being clear, the APP_PRI_FAIL bit being set, the APP_SEC_FAIL bit being clear, and the microprocessor 108 attempting to boot the secondary application 116B. The controller booted 516 state is characterized by the ENABLE bit being clear and the microprocessor 108 executing an application program 116.

From the power off 502 state, when power is applied to the controller 100, a transition to the loader A 506 state occurs.

From the reset 504 state: if the LDR_PRI_FAIL bit is clear, a transition to the loader A 506 occurs; if the LDR_PRI_FAIL bit is set, a transition to the loader B 508 occurs.

From the loader A 506 state: if the watch dog timer 106 expires, a transition to the reset 504 state occurs; if the primary loader 118A successfully boots and the APP_PRI_FAIL bit is clear, a transition to the application A 512 state occurs; if the primary loader 118A successfully boots and the APP_PRI_FAIL bit is set, a transition to the application B 514 state occurs.

From the loader B 508 state: if the watch dog timer 106 expires, a transition to the reset 504 state occurs; if the secondary loader 118B successfully boots and the APP_PRI_FAIL bit is clear, a transition to the application A 512 state occurs; if the secondary loader 118B successfully boots and the APP_PRI_FAIL bit is set, a transition to the application B 514 state occurs.

From the application A 512 state: if the watch dog timer 106 expires, a transition to the reset 504 state occurs; if the primary application 116A successfully boots, a transition to the controller booted 516 state occurs.

From the application B 514 state: if the watch dog timer 106 expires, a transition to the reset 504 state occurs; if the secondary application 116B successfully boots, a transition to the controller booted 516 state occurs.

As may be observed from FIG. 5, the controller 100 is capable of various boot sequences, depending upon which of the stored program copies 116A/116B/118A/118B are good and which are bad. For example, if the primary loader 118A is bad, the secondary loader 118B is good, the primary application 116A is bad, and the secondary application 116B is good, then the following state transitions will occur: power off 502 to loader A 506 to reset 504 to loader B 508 to application A 512 to reset 504 to loader B 508 to application B 514 to controller booted 516. For another example, if the primary loader 118A is good, the primary application 116A is bad, and the secondary application 116B is good, then the following state transitions will occur: power off 502 to loader A 506 to application A 512 to reset 504 to loader A 506 to application B 514 to controller booted 516.

Although the present invention and its objects, features, and advantages have been described in detail, other embodiments are encompassed by the invention. For example, although embodiments have been described in which the storage controller is a RAID controller, the apparatus and method described herein may also be employed in any storage controller that has a FLASH memory for storing programs that must be booted therefrom. In addition, although embodiments have been described having two copies of the stored program, the invention may be expanded to more than two copies of the stored program to provide increased fault-tolerance. In this embodiment, the control and status registers are expanded to accommodate the multiple copies such that the selection logic attempts to boot the program copies in turn until a good copy boots. Still further, although two embodiments have been described having a single FLASH memory device and three FLASH memory devices, respectively, other embodiments with different numbers of FLASH memory devices are contemplated. For example, one embodiment is contemplated in which the controller comprises two FLASH memories each storing a copy of the loader program and the application program. For another example, an embodiment is contemplated in which the controller comprises N FLASH memories each storing a copy of the loader program and the application program, where N is greater than two, for providing a higher level of fault-tolerance than having duplicate copies provides. Furthermore, although embodiments have been described in which particular sizes and types of FLASH memories are employed, the apparatus and method described herein may be employed for various sizes and types of non-volatile memories employed to store programs in a storage controller. For example, multiple FLASH memory devices may be grouped together to provide the necessary data path width that is longer than the data output width of a single FLASH device.

In an alternate contemplated embodiment, the controller 100 includes a mechanical or electrical switch that a human may manually flip if the controller 100 fails to boot. The switch serves essentially the same function as the selection logic 142 and the human serves essentially the same function as the timer 106. The human resets the controller 100 after flipping the switch, which causes the controller 100 to attempt to boot from the other copy of the stored programs. This embodiment has the disadvantage that it requires the human to open the controller 100 enclosure in order to flip the switch, which is prone to human error, and may require too much time, particularly for the human to detect that the controller 100 has failed to boot the first time. Additionally, it may be required that the human is a relatively highly trained person, such as a field engineer, who must be on-site in order to avoid the controller being failed for an unacceptable period.

In another alternate contemplated embodiment, the timer 106 function is performed by the microprocessor 108, such as via a combination of a timer built-in to the microprocessor 108 itself and software, such as an operating system, executing on the microprocessor 108 to service the built-in timer, which preferably generates a very high priority interrupt or a non-maskable interrupt. If the timer expires, the loader program flips a switch, such as the switch mentioned above, and resets the controller so that the controller attempts to boot from the other copy of the stored programs. This embodiment has the disadvantage that it requires at least some portion of the loader program to execute properly; in particular, it requires at least the FLASH sectors that are storing the reset vector and portion of loader program that initializes and services the timer to be good. A further disadvantage is that the timer will not work if the entire FLASH memory device is bad.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. An apparatus for automatically selectively booting from redundant copies of a stored program in a storage-controller to tolerate a fault in up to all but one of the copies, the controller having a processor that begins fetching instructions of the stored program each time the processor is reset, the apparatus comprising:

a timer, coupled to the processor, configured to commence running when the processor is reset a first time, and to reset the processor a second time if said timer expires, wherein said timer is further configured to recommence runing when resetting the processor said second time, and to reset the processor a third time if said timer expires after re-commencing; and selection logic, coupled to the processor, configured to select a first of the redundant copies for provision to the processor in response to said first reset, and to select a second of the redundant copies other than said first of the redundant copies for provision to the processor in response to said second reset, wherein said selection logic is further configured to select said first of the redundant copies for provision to the processor when said timer resets the processor said third time, wherein the storage controller comprises a redundant array of inexpensive disks (RAID) controller, wherein the stored program comprises a program for controlling a redundant array of inexpensive disks.

2. The apparatus as recited in claim 1, wherein said timer is configured to commence running when the processor is reset regardless of whether the processor executes any of the instructions of the stored program.

3. The apparatus as recited in claim 1, wherein said timer is further configured to set an indicator to indicate said first of the redundant copies has failed to boot if said timer expires, wherein said selection logic is configured to select said second of the redundant copies other than said first of the redundant copies for provision to the processor in response to said second reset based on said indicator.

4. The apparatus as recited in claim 3, wherein said indicator retains a value set by said timer after said timer resets the processor said second time, wherein said value indicates said first of the redundant copies has failed to boot.

5. The apparatus as recited in claim 1, wherein said selection logic is further configured to select a third of the redundant copies other than said first and second of the redundant copies for provision to the processor when said timer resets the processor said third time.

6. The apparatus as recited in claim 5, wherein said selection logic is further configured to continue to select subsequent of the redundant copies other than previously selected of the redundant copies for provision to the processor each time said timer resets the processor.

7. The apparatus as recited in claim 6, wherein said first, second and subsequent copies of the stored program are stored in respective first, second and subsequent non-volatile memories of the controller.

8. The apparatus as recited in claim 6, wherein said first, second and subsequent copies of the stored program are stored in a single non-volatile memory of the controller.

9. The apparatus as recited in claim 6, wherein said first, second and subsequent copies of the stored program are stored in a first number of non-volatile memories of the controller, wherein said first number is greater than one but fewer than a second number of said first, second, and subsequent copies of the stored program.

10. The apparatus as recited in claim 1, wherein the stored program includes instructions to disable said timer after successfully booting.

11. The apparatus as recited in claim 10, wherein said successfully booting comprises the stored program copying itself from a non-volatile memory to a random access memory (RAM) of the controller.

12. The apparatus as recited in claim 11, wherein the stored program comprises a loader program and an application program, wherein said successfully booting further comprises said loader program executing from said RAM and successfully copying said application program from said non-volatile memory to said RAM from which the processor may subsequently execute said application program.

13. The apparatus as recited in claim 12, wherein said successfully booting further comprises said application program successfully executing from said RAM.

14. The apparatus as recited in claim 1, wherein said first and second copies of the stored program are stored in a non-volatile memory of the controller in respective distinct first and second address ranges of said non-volatile memory.

15. The apparatus as recited in claim 14, wherein said selection logic is configured to generate a portion of an address for provision to said non-volatile memory, wherein said selection logic is configured to selectively generate a first predetermined value on said portion of said address to cause said first address range to be selected in response to said first reset, and to selectively generate a second predetermined value on said portion of said address to cause said second address range to be selected in response to said second reset.

16. The apparatus as recited in claim 14, wherein the stored program comprises a loader program and redundant copies of an application program, wherein said loader program is configured to selectively load one of said redundant copies of said application program into a random access memory (RAM) of the controller.

17. The apparatus as recited in claim 16, wherein first and second of said redundant copies of said application program are stored in said respective distinct first and second address ranges of said non-volatile memory.

18. The apparatus as recited in claim 14, wherein said non-volatile memory comprises a FLASH memory.

19. The apparatus as recited in claim 1, wherein said first and second copies of the stored program are stored in respective first and second non-volatile memories of the controller.

20. The apparatus as recited in claim 19, wherein said selection logic is configured to generate first and second reset signals to said respective first and second non-volatile memories to hold all but one of said first and second non-volatile memories in reset.

21. The apparatus as recited in claim 20, wherein said selection logic is configured to generate a true value on said first reset signal to said first non-volatile memory in response to said second reset of the processor, and to generate a true value on said second reset signal to said second non-volatile memory in response to said first reset of the processor.

22. The apparatus as recited in claim 20, wherein said first and second non-volatile memories are coupled to the processor by a shared bus.

23. The apparatus as recited in claim 22, wherein said first and second non-volatile memories comprise low pin count (LPC) FLASH memory devices coupled to the processor by said shared bus.

24. The apparatus as recited in claim 19, wherein the stored program comprises a loader program for selectively loading one of redundant copies of an application program into a random access memory (RAM) of the controller.

25. The apparatus as recited in claim 24, wherein first and second redundant copies of said application program are stored in said respective first and second non-volatile memories.

26. The apparatus as recited in claim 24, wherein said redundant copies of said application program are stored in a third non-volatile memory of the controller.

27. The apparatus as recited in claim 1, wherein the stored program comprises a loader program for selectively loading redundant copies of an application program into a random access memory (RAM) of the controller, wherein said loader program is configured to load a first of said redundant copies of said application program into said RAM, to subsequently disable and re-enable said timer, and to subsequently transfer control to said first of said redundant copies of said application program in said RAM.

28. The apparatus as recited in claim 27, wherein said timer comprises a control register, wherein said loader program is configured to atomically disable and re-enable said timer by a single write operation to said control register.

29. The apparatus as recited in claim 28, wherein said loader program is configured to load a second of said redundant copies of said application program into said RAM, rather than said first of said redundant copies of said application program, if said timer expired after said loader program re-enabled said timer.

30. The apparatus as recited in claim 28, wherein said timer is configured to reset the processor a third time if said timer expires after said loader program re-enables said timer, wherein said selection logic is configured to select said first of the redundant copies of said loader program for provision to the processor in response to said third reset if said first of the redundant copies of said loader program successfully booted after the processor was reset said first time.

31. The apparatus as recited in claim 30, wherein said selection logic is configured to select a second of redundant copies of said loader program for provision to the processor in response to said third reset if said second of the redundant copies of said loader program successfully booted after the processor was reset said second time.

32. The apparatus as recited in claim 1, wherein the processor is reset said first time by a power-on reset.

33. The apparatus as recited in claim 1, wherein the processor is reset said first time by an external reset of the controller.

34. The apparatus as recited in claim 1, wherein the stored program is stored in at least one non-volatile memory.

35. The apparatus as recited in claim 34, wherein said at least one non-volatile memory comprises at least one FLASH memory.

36. The apparatus as recited in claim 35, wherein said at least one FLASH memory is programmable during operation of the controller.

37. The apparatus as recited in claim 35, wherein said at least one FLASH memory is erasable during operation of the controller.

38. A storage controller for providing an improved probability of successfully booting, comprising:
 first and second copies of a stored program;
 a microprocessor, coupled to selectively boot said first and second copies of said stored program;
 selection logic, coupling said microprocessor to said first and second stored program copies, wherein said selection logic initially selects said first stored program copy for said microprocessor to boot; and
 a timer, coupled to the microprocessor, configured to reset said microprocessor a first time prior to said selection logic initially selecting said first stored program copy for said microprocessor to boot, said timer further configured to reset said microprocessor a second time if said microprocessor fails to boot said first stored program copy within a predetermined time and to update said selection logic to select said second stored program copy for said microprocessor to boot, said timer further configured to reset said microprocessor a third time if said microprocessor fails to boot said second stored program copy within a predetermined time and to update said selection logic to select said first stored program copy for said microprocessor to boot, wherein the storage controller comprises a redundant array of inexpensive disks (RAID) controller, wherein the stored program comprises a program for controlling a redundant array of inexpensive disks.

39. The storage controller as recited in claim 38, wherein said first and second stored program copies are stored in first and second non-volatile memory devices, respectively.

40. The storage controller as recited in claim 39, wherein said selection logic is configured to generate first and second resets for holding in a reset state one of said first and second non-volatile memory devices, respectively.

41. The storage controller as recited in claim 40, wherein said first and second non-volatile memory devices share a bus of said microprocessor, wherein said selection logic generates said second reset initially to enable said microprocessor to access said first non-volatile memory, and generates said first reset when said timer updates said selection logic if said microprocessor fails to boot said first stored program copy within said predetermined time to enable said microprocessor to access said second non-volatile memory.

42. The storage controller as recited in claim 39, wherein said first and second non-volatile memory devices comprise respective first and second FLASH memory devices.

43. The storage controller as recited in claim 38, wherein said first and second stored program copies are stored in respective first and second address regions of a non-volatile memory device.

44. The storage controller as recited in claim 43, wherein said selection logic is configured to generate one or more address signals to said non-volatile memory device.

45. The storage controller as recited in claim 44, wherein when said microprocessor accesses a predetermined address region within its address space, said selection logic generates said one or more address signals to enable said microprocessor to access said first region initially, and generates said one or more address signals to enable said microprocessor to access said second region when said timer updates said selection logic if said microprocessor fails to boot said first stored program copy within said predetermined time.

46. The storage controller as recited in claim 44, wherein said one or more address signals comprise a most-significant address signal of said non-volatile memory device.

47. The storage controller as recited in claim 43, wherein said non-volatile memory device comprises a FLASH memory device.

48. The storage controller as recited in claim 38, wherein said timer comprises a storage location for storing an indication of whether said microprocessor failed to boot said first stored program copy within said predetermined time, wherein initially said indication indicates said microprocessor has not failed to boot said first stored program copy within said predetermined time.

49. The storage controller as recited in claim 48, wherein said storage location retains its value after said timer resets said microprocessor.

50. The storage controller as recited in claim 38, wherein each of said first and second stored program copies includes instructions for disabling said timer when said microprocessor has successfully booted said respective stored program copy in less than said predetermined time.

51. The storage controller as recited in claim 38, wherein said timer comprises:
 a status register, said status register comprising one or more bits for indicating whether said microprocessor failed to boot said first stored program copy within said predetermined time.

52. The storage controller as recited in claim 38, wherein said timer comprises:
a status register, said status register comprising one or more bits for indicating whether said microprocessor failed to boot said second stored program copy within said predetermined time.

53. The storage controller as recited in claim 38, wherein said timer comprises:
a status register, said status register comprising one or more bits for indicating whether said microprocessor failed more than once to boot said first stored program copy within said predetermined time.

54. The storage controller as recited in claim 38, wherein said timer comprises:
a status register, said status register comprising one or more bits for indicating whether said microprocessor failed more than once to boot said second stored program copy within said predetermined time.

55. The storage controller as recited in claim 38, wherein said timer comprises:
a count register for storing a value, said value specifying said predetermined time.

56. The storage controller as recited in claim 55 wherein in response to a reset of said timer, said count register is reset to a first predetermined said value.

57. The storage controller as recited in claim 56, wherein said value is further programmable by said stored program.

58. The storage controller as recited in claim 38, wherein said timer comprises:
a control register, said control register comprising one or more bits for specifying whether said timer is monitoring for a boot failure of a loader portion or an application portion of said stored program.

59. The storage controller as recited in claim 38, wherein said timer comprises:
a control register, said control register comprising one or more bits for specifying whether a loader portion of said stored program should attempt to boot a first or second copy of an application portion of said stored program.

60. The storage controller as recited in claim 38, further comprising:
a FLASH memory device, coupled to said microprocessor, for storing said first and second copies of said stored program;
wherein said timer comprises a control register, said control register comprising one or more bits for specifying whether accesses by said microprocessor to said FLASH memory device are to a loader or application portion of said stored program.

61. The storage controller as recited in claim 38, wherein said first and second stored program copies comprise different versions of said stored program that provide similar function.

62. A method for improving the probability of a microprocessor of a storage controller successfully booting a program stored therein, the method comprising:
starting a timer a first time in response to the microprocessor being reset a first time;
resetting the microprocessor a second time, after said starting the timer the first time, if the timer expired a first time before the microprocessor successfully boots a first copy of the stored program;
starting the timer a second time in response to said resetting the microprocessor the second time;
causing the microprocessor to attempt to boot a second copy of the stored program after said resetting the microprocessor the second time if the timer expired, the first time, wherein the storage controller comprises a redundant array of inexpensive disks (RAID) controller, wherein the program comprises a program for controlling a redundant array of inexpensive disks;
resetting the microprocessor a third time, after said starting the timer the second time, if the timer expired a second time before the microprocessor successfully boots the second copy of the stored program; and
causing the microprocessor to attempt to boot the first copy of the stored program after said resetting the microporcessor the third time.

63. The method as recited in claim 62, further comprising:
the first copy of the stored program disabling the timer prior to the timer expiring if the microprocessor successfully boots the first copy of the stored program.

64. The method as recited in claim 62, wherein the timer starts running independent of execution of the stored program by the microprocessor.

65. The method as recited in claim 62, wherein the timer is distinct from the microprocessor.

66. The method as recited in claim 62, wherein said causing the microprocessor to attempt to boot a second copy of the stored program comprises:
examining an indicator in a status register of the timer indicating the first copy failed to boot; and
selecting the second copy in response to said examining.

67. The method as recited in claim 66, wherein the first and second copies of the stored program are stored in respective first and second halves of a FLASH memory device of the controller, wherein said selecting the second copy comprises:
generating a predetermined value on an address bit to the FLASH memory device to select the second copy.

68. The method as recited in claim 67, further comprising:
generating an inverse of the predetermined value on the address bit to select the first copy for attempted booting, prior to said resetting the microprocessor.

69. The method as recited in claim 66, wherein the first and second copies of the stored program are stored in respective first and second FLASH memory devices of the controller sharing a bus to the microprocessor, wherein said selecting the second copy comprises:
generating a reset signal to the first FLASH memory device to select the second copy stored in the second FLASH memory device.

70. The method as recited in claim 69, further comprising:
generating a second reset signal to the second FLASH memory device to select the first copy stored in the first FLASH memory device for attempted booting, prior to said resetting the microprocessor the third time.

71. The method as recited in claim 62, wherein the first and second copies of the stored program comprise a loader program for loading an application program.

72. A method for improving the probability of a microprocessor of a storage controller successfully booting a program stored thereon, the method comprising:
attempting to boot a first copy of the stored program;
determining whether the first copy of the stored program failed to boot;
attempting to boot a second copy of the stored program, in response to determining the first copy of the stored program failed to boot, wherein the storage controller comprises a redundant array of inexpensive disks (RAID) controller, wherein the program comprises a program for controlling a redundant array of inexpensive disks;
determining whether the second copy of the stored program failed to boot; and attempting to boot the first copy of hte stored program, in response to determining the second copy of the stored program failed to boot.

73. The method as recited in claim 72, further comprising:
determining the second copy failed to boot; and
attempting to boot the first copy, in response to said determining the second copy failed to boot.

74. The method as recited in claim 72, further comprising:
determining the second copy failed to boot; and
attempting to boot a third copy of the stored program, in response to said determining the second copy failed to boot.

75. The method as recited in claim 72, wherein said determining the first copy of the stored program failed to boot comprises detecting a timeout of a timer of the controller that commenced running substantially coincidentally with said attempting to boot the first copy of the stored program.

76. The method as recited in claim 72, wherein the first copy of the stored program comprises a first copy of a loader program and the second copy of the stored program comprises a second copy of the loader program, the method further comprising:
determining whether the second copy of the loader program successfully booted;
re-starting the timer, in response to determining the second copy of the loader program successfully booted; and
the second copy of the loader program attempting to boot a first copy of an application program of the stored program, after said re-starting the timer.

77. The method as recited in claim 76, further comprising:
determining whether the first-copy of the application program failed to boot;
re-booting the second copy of the loader program, in response to determining the first copy of the application program failed to boot; and
the second copy of the loader program attempting to boot a second copy of the application program, in response to said determining the first copy of the application program failed to boot.

78. The method as recited in claim 77 further comprising:
determining whether the second copy of the application program successfully booted; and
disabling the timer, in response to determining the second copy of the application program successfully booted.

79. The method as recited in claim 72, wherein the first copy of the stored program comprises a first copy of a loader program and the second copy of the stored program comprises a second copy of the loader program, the method further comprising:
re-starting the timer, in response to determining the first copy of the loader program successfully booted; and
the first copy of the loader program attempting to boot a first copy of an application program of the stored program, after said re-starting the timer.

80. The method as recited in claim 79, further comprising:
determining whether the first copy of the application program failed to boot;
re-booting the first copy of the loader program, in response to determining the first copy of the application program failed to boot; and
the first copy of the loader program attempting to boot a second copy of the application program, in response to said determining the first copy of the application program failed to boot.

81. The method as recited in claim 80, further comprising:
determining whether the second copy of the application program successfully booted; and
disabling the timer, in response to determining the second copy of the application program successfully booted.

* * * * *

UNITED STATES PATENT AND TRADEMARK OFFICE
CERTIFICATE OF CORRECTION

| | | |
|---|---|---|
| PATENT NO. | : 7,523,350 B2 | Page 1 of 1 |
| APPLICATION NO. | : 11/140106 | |
| DATED | : April 21, 2009 | |
| INVENTOR(S) | : Dwight Oliver Lintz and Yuanru Frank Wang | |

It is certified that error appears in the above-identified patent and that said Letters Patent is hereby corrected as shown below:

Column 20, line 36, claim 68: after "prior to said resetting the microprocessor", please add "the first time".

Signed and Sealed this

Nineteenth Day of May, 2009

JOHN DOLL
*Acting Director of the United States Patent and Trademark Office*